(12) United States Patent
Von Berg et al.

(10) Patent No.: US 9,890,650 B2
(45) Date of Patent: Feb. 13, 2018

(54) CARBON SEAL SPRING ASSEMBLY

(71) Applicant: UNITED TECHNOLOGIES CORPORATION, Farmington, CT (US)

(72) Inventors: Kaleb Von Berg, East Hartford, CT (US); Adam G. Smedresman, Larchmont, NY (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/188,546

(22) Filed: Jun. 21, 2016

(65) Prior Publication Data
US 2017/0362949 A1  Dec. 21, 2017

(51) Int. Cl.
*F16J 15/44* (2006.01)
*F01D 11/00* (2006.01)

(52) U.S. Cl.
CPC ...... *F01D 11/003* (2013.01); *F05D 2220/323* (2013.01); *F05D 2240/60* (2013.01); *F05D 2260/52* (2013.01)

(58) Field of Classification Search
CPC ........... F05D 2220/323; F05D 2240/60; F05D 2260/52; F01D 11/003; F16J 15/3436; F16J 15/3452
See application file for complete search history.

(56) References Cited

U.S. PATENT DOCUMENTS

| | | | | |
|---|---|---|---|---|
| 2,723,868 | A * | 11/1955 | Hartranft | F16J 15/38 277/353 |
| 5,141,389 | A * | 8/1992 | Bear | F01D 3/00 277/348 |
| 5,558,341 | A * | 9/1996 | McNickle | F16J 15/3488 277/400 |
| 7,648,143 | B2 * | 1/2010 | Davis | F01D 25/183 277/349 |
| 8,251,372 | B2 * | 8/2012 | Wood | F16J 15/26 277/511 |
| 9,194,424 | B2 * | 11/2015 | Garrison | F16C 32/0607 |
| 2007/0085278 | A1 * | 4/2007 | Davis | F01D 25/183 277/411 |
| 2012/0211944 | A1 * | 8/2012 | Nishimoto | F01D 11/16 277/422 |

* cited by examiner

*Primary Examiner* — Gilbert Y Lee
(74) *Attorney, Agent, or Firm* — Snell & Wilmer L.L.P.

(57) ABSTRACT

A carbon seal assembly for a gas turbine engine is disclosed. The carbon seal assembly includes a first carbon seal. The carbon seal assembly also includes a first carbon seal spring configured to provide force against the first carbon seal in a first axial direction, the first carbon seal spring having an annular shape and circumferentially disposed around a first shaft of the gas turbine engine.

8 Claims, 17 Drawing Sheets

CARBON SEAL SPRING ASSEMBLY

FIELD

The present disclosure relates to seals and, more particularly, to carbon seals in bearing compartments of gas turbine engines.

BACKGROUND

Circumferential carbon seals in bearing compartments of gas turbine engines provide sealing of oil used to lubricate parts of the gas turbine engine. Bearing assemblies may also support a rotating shaft of the gas turbine engine. The circumferential carbon seals may be sealed against a seal carrier and against rotating seal components of the gas turbine engine.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A carbon seal assembly for a gas turbine engine is disclosed. The carbon seal assembly includes a first carbon seal. The carbon seal assembly also includes a first carbon seal spring configured to provide force against the first carbon seal in a first axial direction, the first carbon seal spring having an annular shape and circumferentially disposed around a first shaft of the gas turbine engine.

In any of the foregoing assemblies, the carbon seal assembly includes a second carbon seal, and the first carbon seal spring is further configured to provide force against the second carbon seal in a second axial direction opposite the first axial direction.

In any of the foregoing assemblies, the carbon seal assembly includes a second carbon seal, a second carbon seal spring having the annular shape, and a mating hardware, the first carbon seal spring is further configured to provide force against the mating hardware in a second axial direction opposite the first axial direction, and the second carbon seal spring is configured to provide force against the second carbon seal in the second axial direction and configured to provide force against the mating hardware in the first axial direction.

In any of the foregoing assemblies, the second carbon seal spring is circumferentially disposed around a second shaft of the gas turbine engine.

In any of the foregoing assemblies, the first shaft and the second shaft have different diameters.

In any of the foregoing assemblies, the first shaft and the second shaft have the same diameter.

In any of the foregoing assemblies, the first carbon seal spring is a wave spring configured to contact the first carbon seal at a plurality of contact surfaces.

In any of the foregoing assemblies, the first carbon seal spring is a bellows spring configured to contact the first carbon seal at a uniform contact surface.

In any of the foregoing assemblies, the first carbon seal spring is a large diameter coil spring configured to contact the first carbon seal at a uniform contact surface.

In any of the foregoing assemblies, the first carbon seal spring is a large diameter tapered coil spring configured to contact the first carbon seal at a uniform contact surface.

In any of the foregoing assemblies, the first carbon seal spring is a diaphragm spring configured to contact the first carbon seal at a uniform contact surface.

A gas turbine engine is disclosed. The gas turbine engine includes a first carbon seal. The gas turbine engine also includes a first carbon seal spring configured to provide force against the first carbon seal in a first axial direction and provide force against a mating hardware in a second axial direction opposite the first axial direction, the first carbon seal spring having an annular shape and circumferentially disposed around an outer shaft of the gas turbine engine. The gas turbine engine also includes a second carbon seal. The gas turbine engine also includes a second carbon seal spring having the annular shape, circumferentially disposed around an inner shaft of the gas turbine engine, and configured to provide force against the second carbon seal in the second axial direction and configured to provide force against the mating hardware in the first axial direction.

In any of the foregoing gas turbine engines, the first carbon seal spring is a wave spring, a bellows spring, a large diameter coil spring, a large diameter tapered coil spring, or a diaphragm spring.

In any of the foregoing gas turbine engines, the second carbon seal spring is a wave spring, a bellows spring, a large diameter coil spring, a large diameter tapered coil spring, or a diaphragm spring.

In any of the foregoing gas turbine engines, the first carbon seal spring and the second carbon seal spring are a same type of spring.

In any of the foregoing gas turbine engines, the first carbon seal spring and the second carbon seal spring are a different type of spring.

A method of sealing a carbon seal assembly is disclosed. The method includes disposing a carbon seal in the carbon seal assembly, around a shaft of a gas turbine engine. The method also includes disposing a carbon seal spring in the carbon seal assembly, the carbon seal spring configured to provide force against the carbon seal in an axial direction, the carbon seal spring having an annular shape and circumferentially disposed around the shaft of the gas turbine engine.

In any of the foregoing methods, the carbon seal spring is configured to contact the carbon seal at a plurality of contact surfaces.

In any of the foregoing methods, the carbon seal spring is configured to contact the carbon seal at a uniform contact surface.

In any of the foregoing methods, the carbon seal spring is a wave spring, a bellows spring, a large diameter coil spring, a large diameter tapered coil spring, or a diaphragm spring.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that a first component is positioned at a greater distance away from the engine central longitudinal axis, than the second component. A first component that is "radially inward" of a second component means that the first component is positioned closer to the engine central longitudinal axis, than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis.

Figure 1:
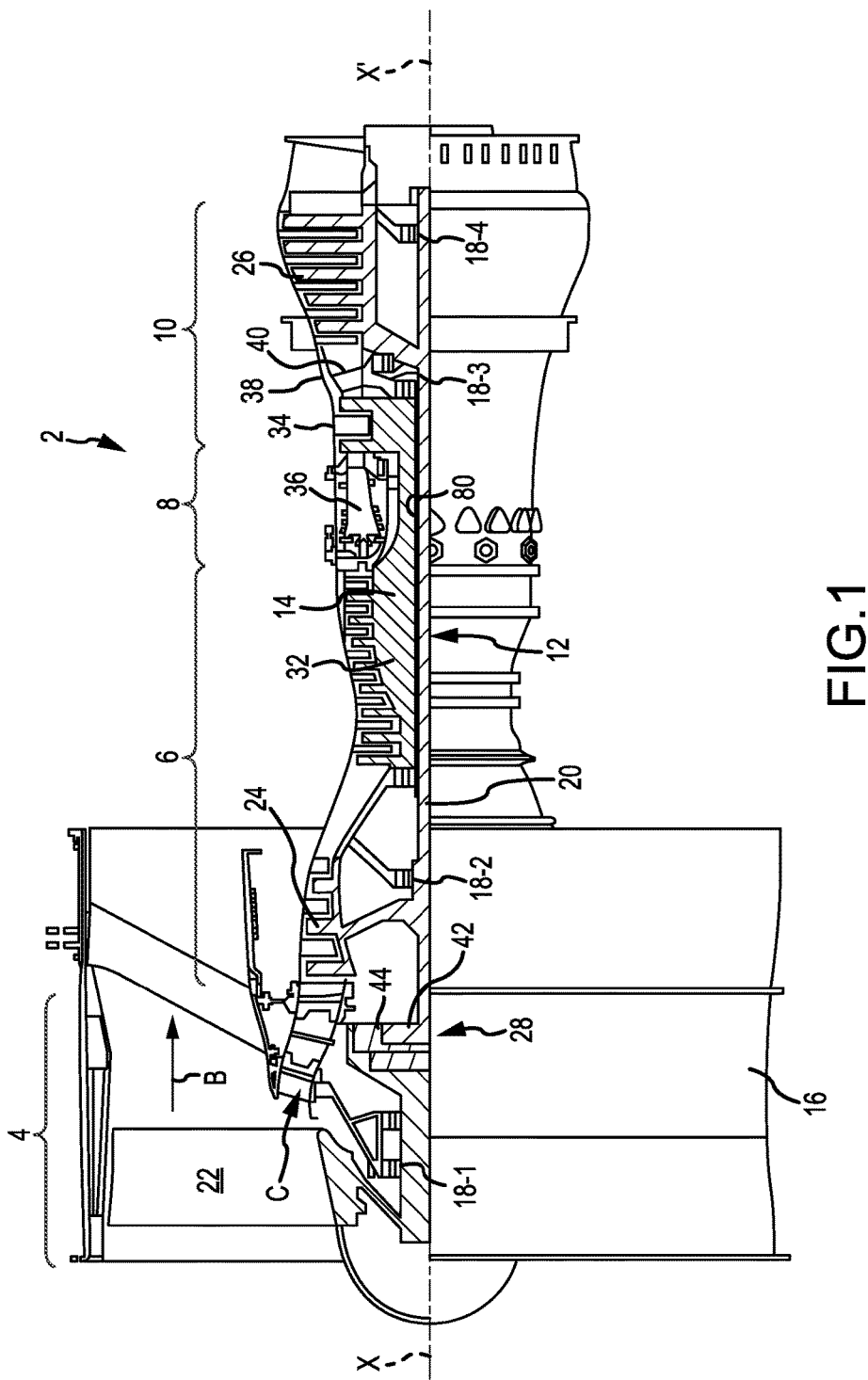
FIG. 1 is a schematic cross-section of a gas turbine engine.

In various embodiments and with reference to FIG. 1, an exemplary gas turbine engine 2 is provided. Gas turbine engine 2 may be a two-spool turbofan that generally incorporates a fan section 4, a compressor section 6, a combustor section 8 and a turbine section 10. Alternative engines may include, for example, an augmentor section among other systems or features. In operation, fan section 4 can drive air along a bypass flow-path B while compressor section 6 can drive air along a core flow-path C for compression and communication into combustor section 8 then expansion through turbine section 10. Although depicted as a turbofan gas turbine engine 2 herein, it should be understood that the concepts described herein are not limited to use with turbofans as the teachings may be applied to other types of turbine engines including three-spool architectures.

Gas turbine engine 2 may generally comprise a low speed spool 12 and a high speed spool 14 mounted for rotation about an engine central longitudinal axis X-X' relative to an engine static structure 16 via several bearing compartments 18-1, 18-2, 18-3, and 18-4. It should be understood that various bearing compartments at various locations may alternatively or additionally be provided, including for example, bearing system 18-1, bearing system 18-2, bearing system 18-3, and bearing system 18-4.

Low speed spool 12 may generally comprise an inner shaft 20 that interconnects a fan 22, a low pressure compressor section 24 (e.g., a first compressor section) and a low pressure turbine section 26 (e.g., a first turbine section). Inner shaft 20 may be connected to fan 22 through a geared architecture 28 that can drive the fan 22 at a lower speed than low speed spool 12. Geared architecture 28 may comprise a gear assembly 42 enclosed within a gear housing 44. Gear assembly 42 couples the inner shaft 20 to a rotating fan structure. High speed spool 14 may comprise an outer shaft 80 that interconnects a high pressure compressor section 32 (e.g., second compressor section) and high pressure turbine section 34 (e.g., second turbine section). A combustor 36 may be located between high pressure compressor section 32 and high pressure turbine section 34. A mid-turbine frame 38 of engine static structure 16 may be located generally between high pressure turbine section 34 and low pressure turbine section 26. Mid-turbine frame 38 may support one or more bearing compartments 18 (such as 18-3) in turbine section 10. Inner shaft 20 and outer shaft 80 may be concentric and rotate via bearing compartments 18 about the engine central longitudinal axis X-X', which is collinear with their longitudinal axes. As used herein, a "high pressure" compressor or turbine experiences a higher pressure than a corresponding "low pressure" compressor or turbine.

The core airflow C may be compressed by low pressure compressor section 24 then high pressure compressor section 32, mixed and burned with fuel in combustor 36, then expanded over high pressure turbine section 34 and low pressure turbine section 26. Mid-turbine frame 38 includes airfoils 40, which are in the core airflow path. Turbines 26, 34 rotationally drive the respective low speed spool 12 and high speed spool 14 in response to the expansion.

Gas turbine engine 2 may be, for example, a high-bypass geared aircraft engine. In various embodiments, the bypass ratio of gas turbine engine 2 may be greater than about six (6). In various embodiments, the bypass ratio of gas turbine engine 2 may be greater than ten (10). In various embodiments, geared architecture 28 may be an epicyclic gear train, such as a star gear system (sun gear in meshing engagement with a plurality of star gears supported by a carrier and in meshing engagement with a ring gear) or other gear system. Geared architecture 28 may have a gear reduction ratio of greater than about 2.3 and low pressure turbine section 26 may have a pressure ratio that is greater than about 5. In various embodiments, the bypass ratio of gas turbine engine 2 is greater than about ten (10:1). In various embodiments, the diameter of fan 22 may be significantly larger than that of the low pressure compressor section 24, and the low pressure turbine section 26 may have a pressure ratio that is greater than about 5:1. Low pressure turbine section 26 pressure ratio may be measured prior to inlet of low pressure turbine section 26 as related to the pressure at the outlet of low pressure turbine section 26 prior to an exhaust nozzle. It should be understood, however, that the above parameters are exemplary of various embodiments of a suitable geared architecture engine and that the present disclosure contemplates other turbine engines including direct drive turbofans.

In various embodiments, the next generation of turbofan engines may be designed for higher efficiency, which may be associated with higher pressure ratios and higher temperatures in the high speed spool 14. These higher operating temperatures and pressure ratios may create operating environments that may cause thermal loads that are higher than thermal loads conventionally encountered, which may shorten the operational life of current components. In various embodiments, operating conditions in high pressure compressor section 32 may be approximately 1400° F. (approximately 760° C.) or more, and operating conditions in combustor 36 may be higher.

In various embodiments, combustor section 8 may comprise one or more combustor 36. As mentioned, the core airflow C may be compressed, then mixed with fuel and ignited in the combustor 36 to produce high speed exhaust gases.

Figure 2A:
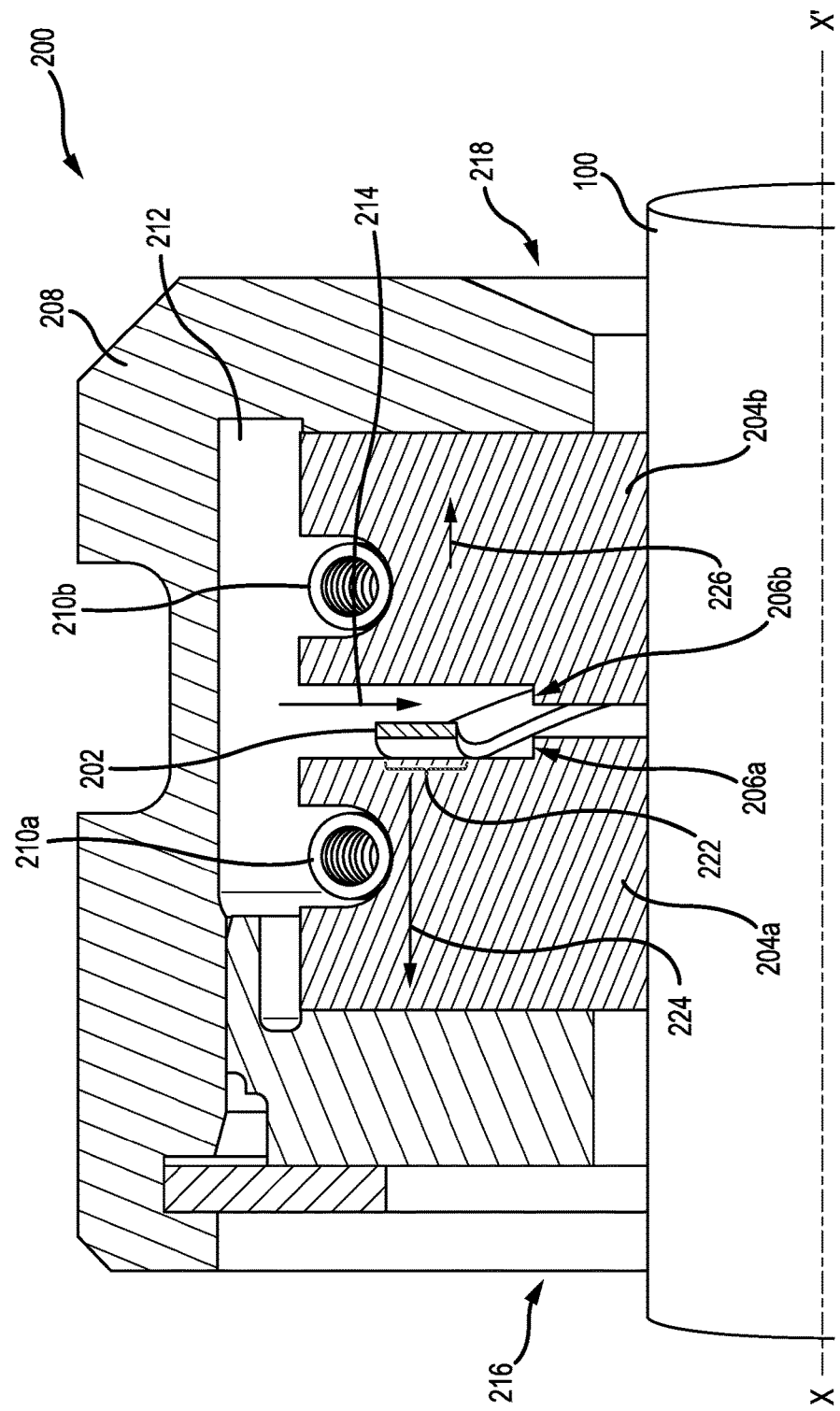
FIGS. 2A and 2B are schematic cross-sections of carbon seal assemblies with wave spring carbon seal springs.

With reference to FIG. 2A, a cross-section of carbon seal assembly 200 is shown. Carbon seal assembly 200 may be located in a bearing system of a gas turbine engine (e.g., bearing compartments 18-1, 18-2, 18-3, and 18-4 of FIG. 1).

Carbon seal assembly 200 includes carbon seal arrangement 208 housing a first carbon seal 204a and a second carbon seal 204b. As used herein, a single reference number may be used to collectively refer to elements having a common reference number followed by a different letter. For example, carbon seals 204 may refer collectively to the first carbon seal 204a and the second carbon seal 204b.

The carbon seals 204 are used to seal oil of an oil section 218 from air of an air section 216. Buffer air is provided in buffer air section 212, and travels in buffer air direction 214 to assist in sealing, by leaking air past the shaft 100 and into the oil section 218 and into the air section 216. The carbon seals 204 may be circumferentially disposed around a shaft 100, such as outer shaft 80 or inner shaft 20 of FIG. 1. Shaft 100 may have an axis of rotation X-X' similar to the axis of rotation of outer shaft 80 and inner shaft 20 of FIG. 1. The first carbon seal 204a and the second carbon seal 204b may each be a single, generally annular unit, or they may each be circumferentially segmented, such that when a group of segments are aligned circumferentially, the group of segments forms a single, generally annular unit. When the first carbon seal 204a and the second carbon seal 204b are segmented, each group of segments may be held together by garter springs 210a-210b. The garter springs 210a-210b are configured to exert a force against the carbon seals 204a-204b in a radially inward direction, against the shaft 100.

Carbon seals 204 may also be located flush against the carbon seal arrangement 208, to maintain and provide a sealing interface. Carbon seal spring 202 is located between the carbon seals 204 such that forces are exerted in opposite directions, against the carbon seals 204 onto the carbon seal arrangement 208 (or an element coupled to carbon seal arrangement 208).

Figure 2B:
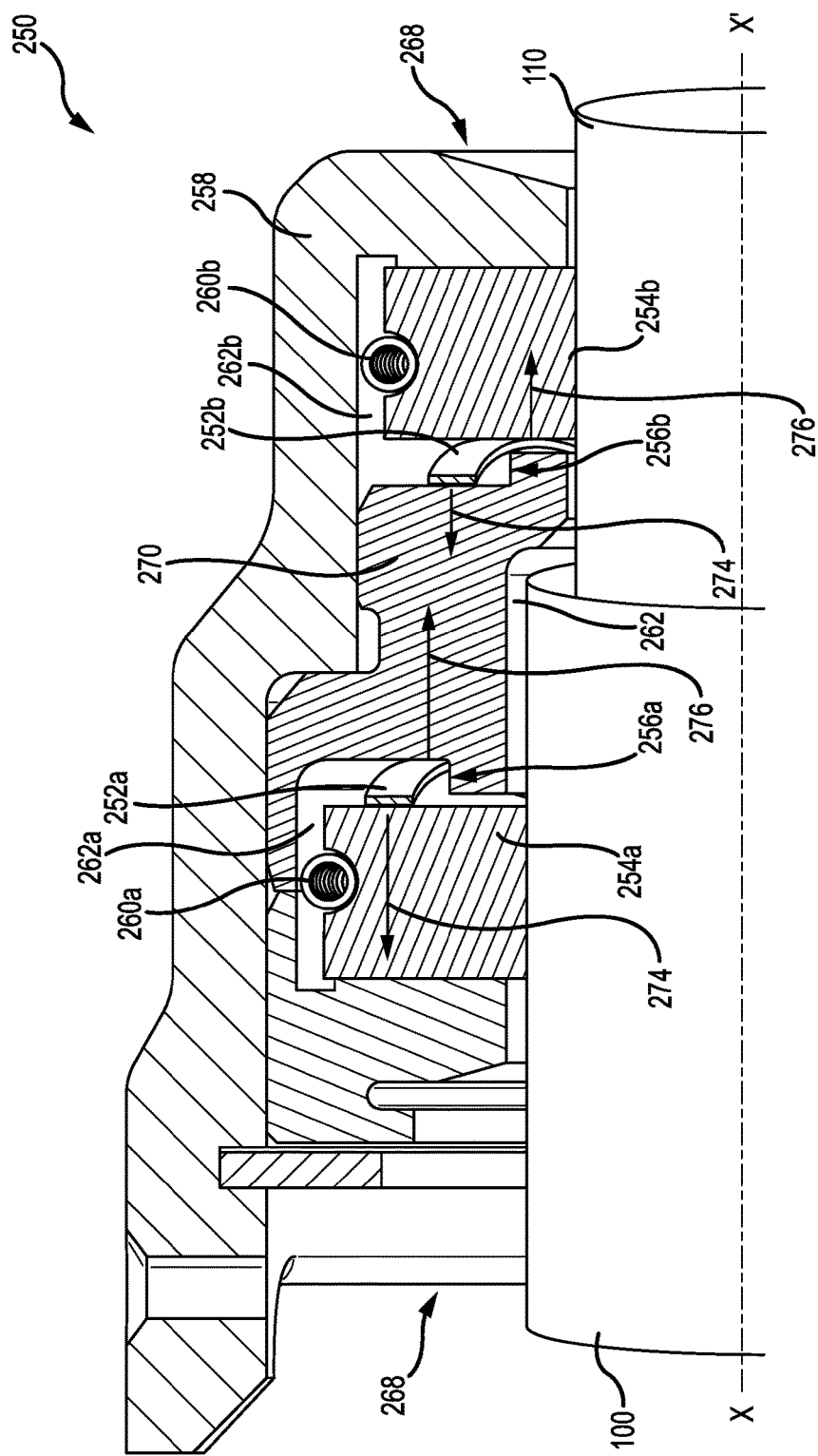
Figure 7:
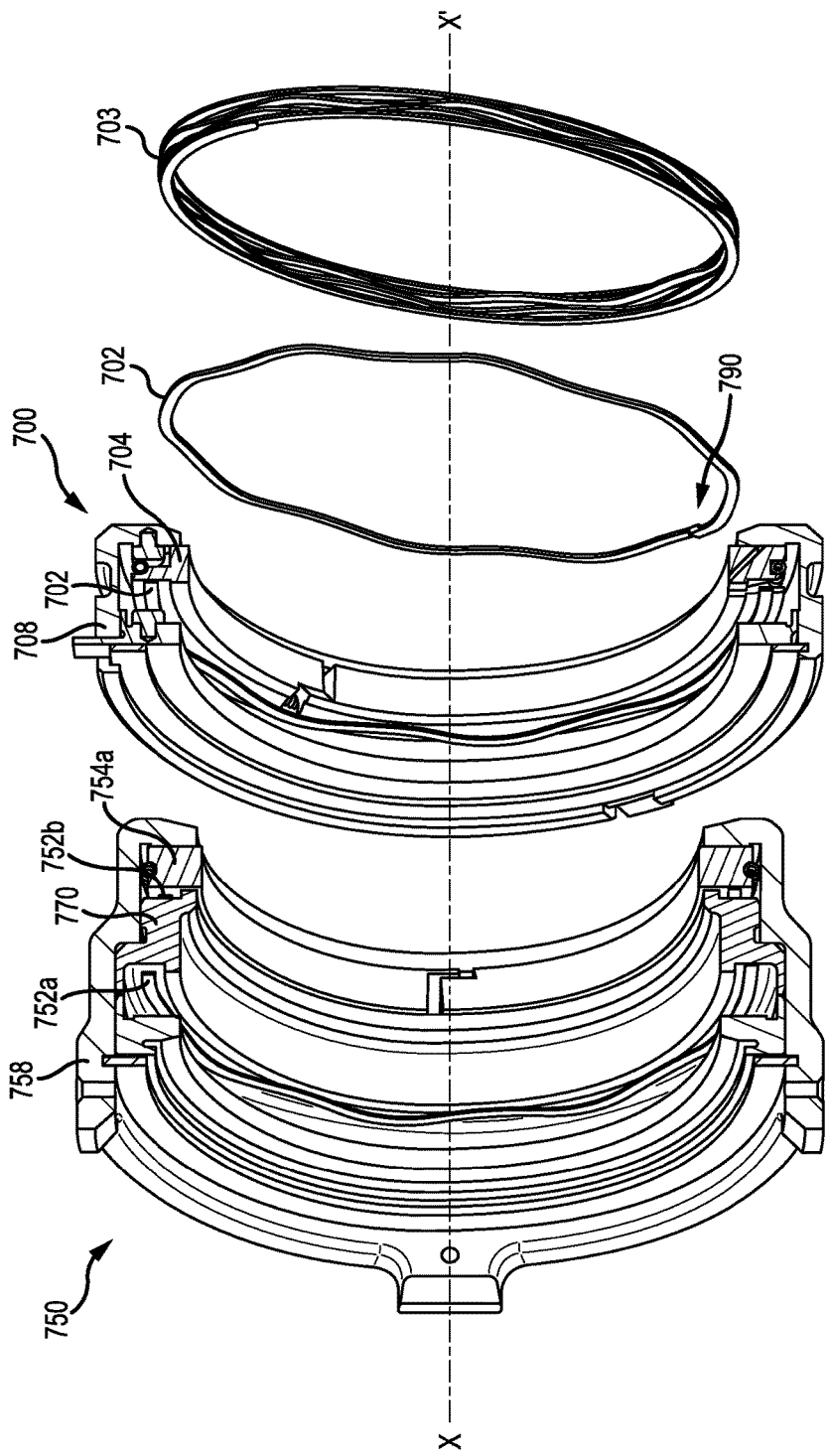
FIG. 7 is a schematic cross-section of carbon seal assemblies with wave spring carbon seal springs.

Carbon seal spring 202 provides a force in the forward direction 224 and aft direction 226. Use of carbon seal spring 202 obviates the forming of holes in the carbon seals 204, resulting in a more structurally durable and robust carbon seal than is conventionally known. Carbon seal spring 202 is annular in shape, circumferentially disposed around the shaft 100, and is concentric with the shaft 100, similar to carbon seals 204. Carbon seal spring 202, as shown in FIGS. 2A, 2B, and 7, are wave springs, having a sinusoidal shape along the circumference of the spring. In addition to obviating the use of holes, carbon seal spring 202 provides a more uniform distribution of force, as compared to conventional springs, which may be disposed at a limited number of discrete points. A more uniform distribution of force may result in improved seal performance at low differential pressure conditions. Pressure outside of carbon seal assembly 200 may be higher than pressure inside of carbon seal assembly 200 during operation of the gas turbine engine 2. When the gas turbine engine 2 is starting up or shut down, the differential pressure between the outside of carbon seal assembly 200 and the inside of carbon seal assembly 200 may be minimized (e.g., the low differential pressure condition). In these conditions, the carbon seal spring 202 assists in maintaining sealing.

Carbon seal spring 202 contacts the carbon seals 204 at a contact surface 222, which may be wider in cross sectional area as compared to an area of contact of conventional springs. In addition, conventional springs placed inside holes may be easily displaced and may subsequently cause damage in other parts of the gas turbine engine 2. Carbon seal spring 202 may also be easier to replace or service than conventional springs, which may be smaller than ³⁄₁₆th of an inch in diameter.

Carbon seals 204 include a first spring retention surface 206a and a second spring retention surface 206b. The spring retention surfaces 206 provide a barrier between the carbon seal spring 202 and the shaft 100. The spring retention surfaces 206 prevent the carbon seal spring 202 from becoming dislodged and potentially contacting rotating hardware such as shaft 100. Dislodgement of the carbon seal spring 202 may result in oil and air leakage.

FIG. 2B illustrates a carbon seal assembly 250, including carbon seal arrangement 258 housing a first carbon seal 254a and a second carbon seal 254b, and a first garter spring 260a and a second garter spring 260b. Carbon seal assembly 250 may be located in a bearing system of a gas turbine engine where spools or shafts of different diameters meet, such as bearing system 18-3 of FIG. 1. As shown in FIG. 2B, the first carbon seal 254a is located against shaft 100 and the second carbon seal 254b is located against a second shaft 110. While the shaft 100 is shown as having a larger diameter than the second shaft 110, the second shaft 110 may have a larger diameter than the shaft 100. While the shaft 100 and the second shaft 110 are shown as having different diameters, they may have the same diameter. Shaft 100 may have an axis of rotation X-X' similar to the axis of rotation of outer shaft 80 and inner shaft 20 of FIG. 1. Carbon seal assembly 250 provides sealing of oil located in oil sections 268 from air located in air compartment 262 within carbon seal arrangement 258. Oil section 268 may include multiple oil sections.

Carbon seal springs 252 similar to carbon seal spring 202 of FIG. 2A are used to provide axial loading of the carbon seals 254 to enable a positive seal. A first carbon seal spring 252a provides forces between the first carbon seal 254a and mating hardware 270, in a forward direction 274 against the first carbon seal 254a and in an aft direction 276 against the mating hardware 270. Similarly, a second carbon seal spring 252b provides forces in between the second carbon seal 254b and the mating hardware 270, in a forward direction 274 against the mating hardware 270 and in an aft direction 276 against the second carbon seal 254b. The mating hardware 270 is located within the carbon seal arrangement 258, and may facilitate sealing when transitioning between the shaft 100 and the second shaft 110.

As shown in FIG. 2B and similar to the carbon seal spring 202 of FIG. 2A, carbon seal springs 252 are wave springs, which provide a continuous spring structure while also providing a discrete plurality of dispersed forces consistent with the plurality of contact surfaces innately associated with a wave spring. Multiple wave springs may be used at a single location to provide axial loading. Further, a wave spring with shim ends may be used in order to provide a uniform force across the contact surface. Spring retention surfaces 256 are located on the mating hardware 270, instead of the carbon seal, as shown in FIG. 2A, resulting in a robust, structurally durable carbon seal.

Figure 3A:
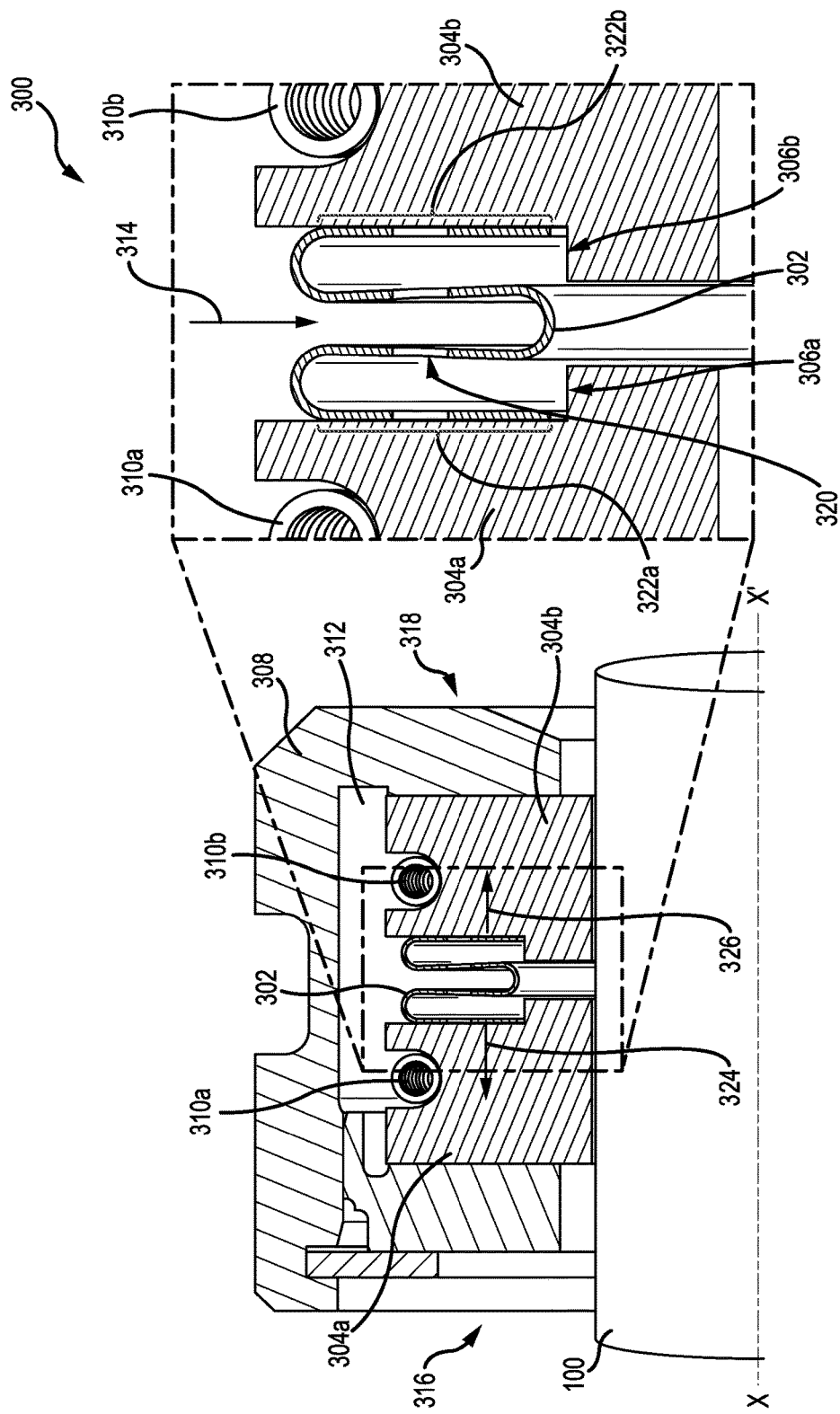
FIGS. 3A and 3B are schematic cross-sections of carbon seal assemblies with bellows spring carbon seal springs.

FIG. 3A illustrates a carbon seal assembly 300 similar to carbon seal assembly 200, with similar elements which are numbered similarly, such as carbon seals 304, spring retention surfaces 306, carbon seal arrangement 308, garter springs 310, buffer air section 312, buffer air direction 314, air section 316, and oil section 318.

Carbon seal assembly 300 also includes carbon seal spring 302, which comprises a bellows spring. Carbon seal spring 302 provides force against the first carbon seal 304a in a forward direction 324 onto the carbon seal arrangement 308, as well as force against the second carbon seal 304b in an aft direction 326 onto carbon seal arrangement 308. Buffer air of buffer air section 312 travels in buffer air direction 314 and through holes 320 of the carbon seal spring 302. Carbon seal spring 302 disperses force against the carbon seals 304. Contact surfaces 322 of the carbon seal spring 302 against carbon seals 304 are located between the carbon seal spring 302 and the carbon seals 304 across the circumference of the carbon seal spring 302.

Figure 3B:
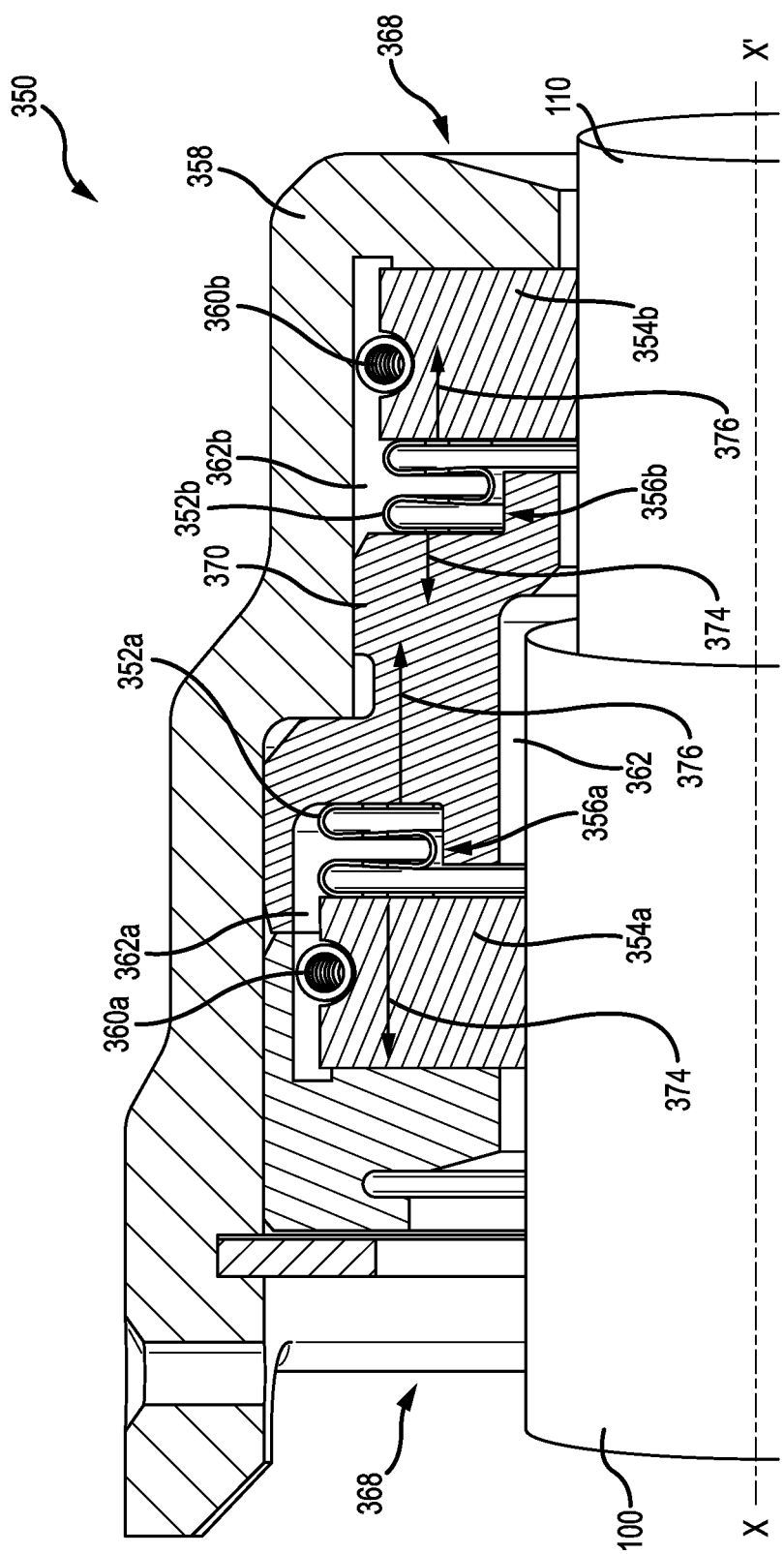

FIG. 3B illustrates a carbon seal assembly 350 similar to carbon seal assembly 250, with similar elements which are numbered similarly, such as carbon seals 354, spring retention surfaces 356, carbon seal arrangement 358, garter springs 360, air section 362, oil sections 368, and mating hardware 370. The first carbon seal 354a and the second carbon seal 354b are disposed circumferentially around the shaft 100 and the second shaft 110, respectively. Oil section 368 may include multiple oil sections.

Carbon seal assembly 350 also includes carbon seal springs 352, which comprise bellows springs similar to carbon seal spring 302. The carbon seal springs 352 provide forces in a forward direction 374 and in an aft direction 376, similar to carbon seals 252 of FIG. 2B. Buffer air may not necessarily pass through the carbon seal springs 352, and accordingly, unlike the carbon seal spring 302, carbon seal springs 352 may not necessarily have holes similar to holes 320 of carbon seal spring 302.

Figure 4A:
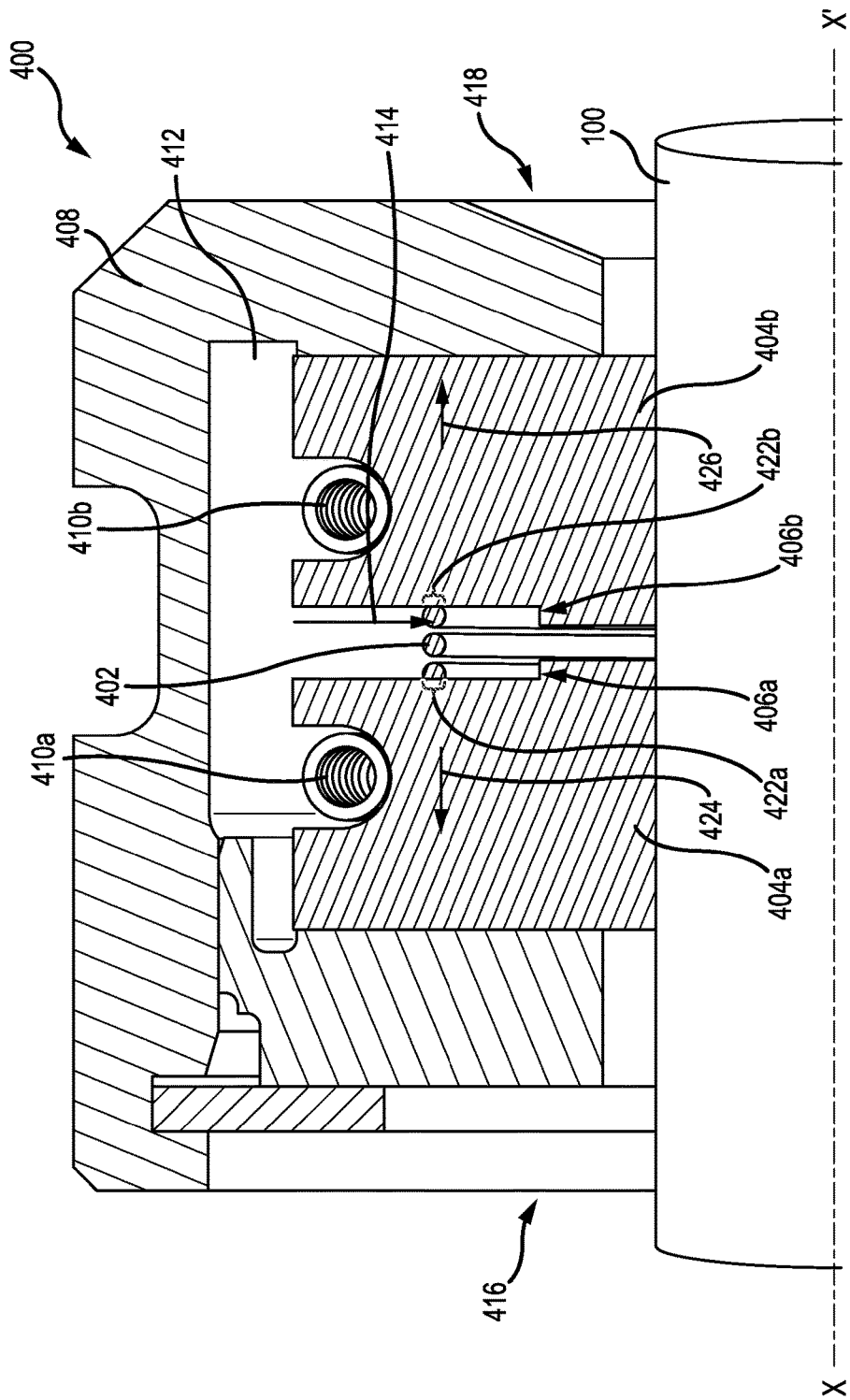
FIGS. 4A and 4B are schematic cross-sections of carbon seal assemblies with large diameter coil spring carbon seal springs.

FIG. 4A illustrates a carbon seal assembly 400 similar to carbon seal assemblies 200 and 300, with similar elements which are numbered similarly, such as carbon seals 404, spring retention surfaces 406, carbon seal arrangement 408, garter springs 410, buffer air section 412, buffer air direction 414, air section 416, and oil section 418.

Carbon seal assembly 400 also includes carbon seal spring 402, which is a large diameter coil spring. Carbon seal spring 402 may have a diameter larger than the diameter of the shaft 100. Similar to carbon seal spring 302, which comprises a bellows spring, carbon seal spring 402 provides has contact surfaces 422 between the carbon seal spring 402 and first carbon seal 404a, and between the carbon seal spring 402 and second carbon seal 404b, respectively. Carbon seal spring 402 provides forces in a forward direction 424 and an aft direction 426. While a single carbon seal spring 402 is illustrated, multiple carbon seal springs having varying diameters may be used in a nested arrangement to provide increased spring load and/or force and an overall increased contact area against the carbon seals 404 and/or supporting carbon seal arrangement 408.

Figure 4B:
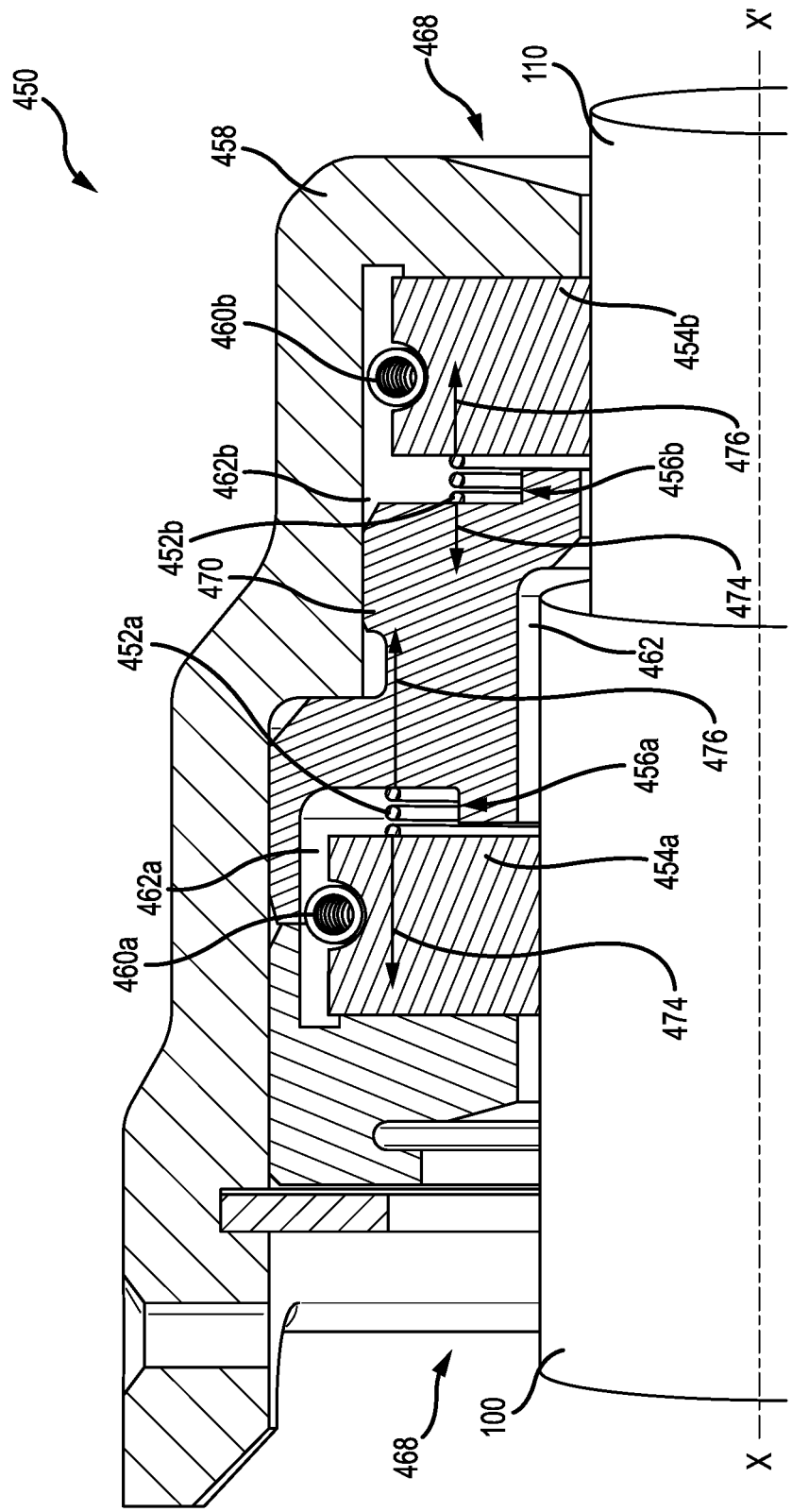

FIG. 4B illustrates a carbon seal assembly 450 similar to carbon seal assemblies 250 and 350, with similar elements which are numbered similarly, such as carbon seals 454, spring retention surfaces 456, carbon seal arrangement 458, garter springs 460, air section 462, oil sections 468, and mating hardware 470. Carbon seals 454a and 454b are disposed circumferentially around shaft 100 and second shaft 110, respectively. Oil section 468 may include multiple oil sections.

Carbon seal assembly 450 also includes carbon seal springs 452, which are large diameter coil springs similar to carbon seal spring 402, having diameters larger than shaft 100 and second shaft 110. The carbon seal springs 452 provide forces in a forward direction 474 and in an aft direction 476, similar to carbon seals 252 and 352.

Figure 5A:
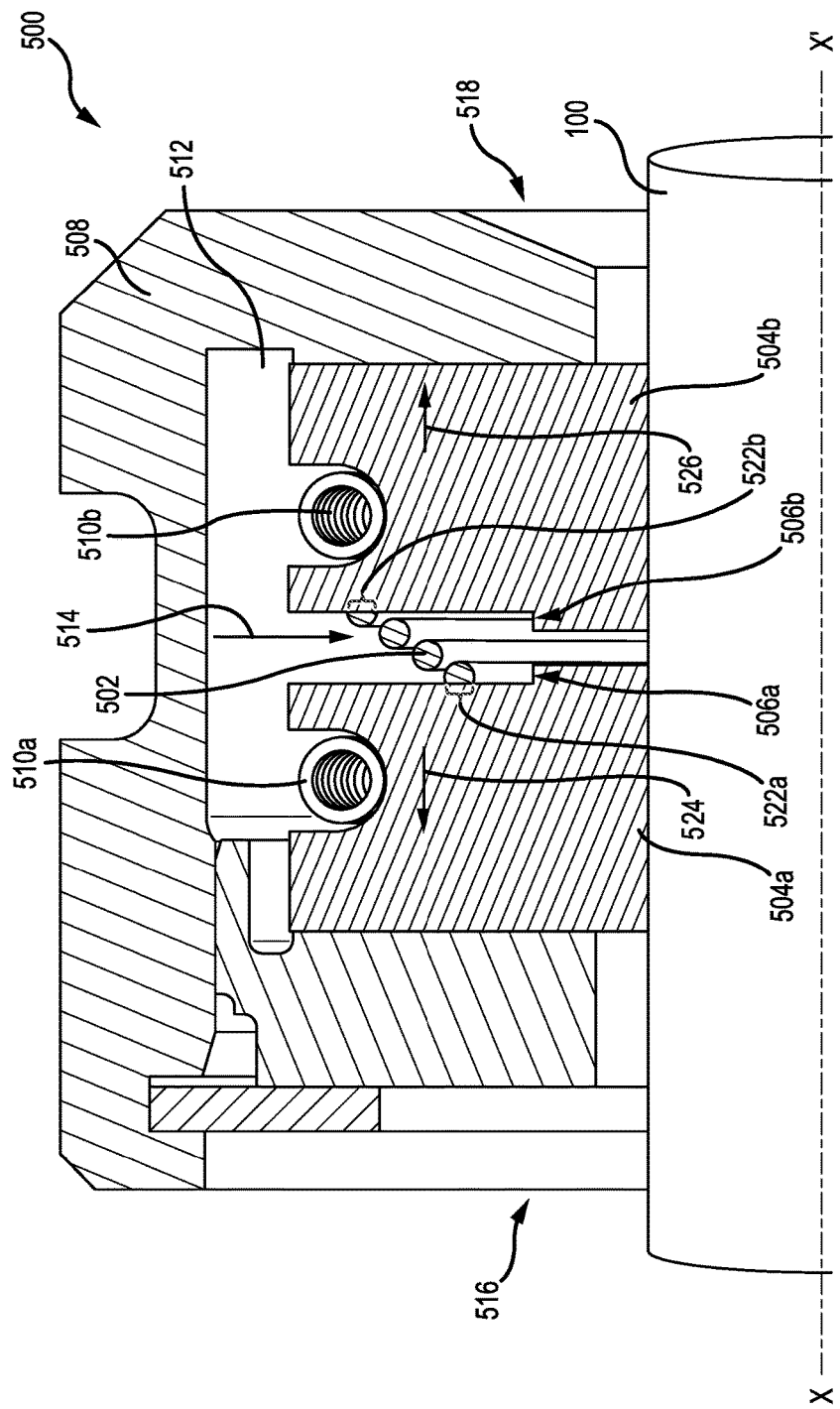
FIGS. 5A and 5B are schematic cross-sections of carbon seal assemblies with large diameter tapered coil spring carbon seal springs.

FIG. 5A illustrates a carbon seal assembly 500 similar to carbon seal assemblies 200, 300, and 400, with similar elements which are numbered similarly, such as carbon seals 504, spring retention surfaces 506, carbon seal arrangement 508, garter springs 510, buffer air section 512, buffer air direction 514, air section 516, and oil section 518.

Carbon seal assembly 500 also includes carbon seal spring 502, which is a large diameter tapered coil spring. Carbon seal spring 502 may have a diameter at all points of the carbon seal spring 502, larger than the diameter of the shaft 100. While carbon seal spring 502 is shown as radially tapering in the forward direction, the carbon seal spring 502 may radially taper in the aft direction. Similar to carbon seal springs 302 and 402, carbon seal spring 502 has contact surfaces 522a and 522b between the carbon seal spring 502 and first carbon seal 504a, and between the carbon seal spring 502 and second carbon seal 504b, respectively. Carbon seal spring 502 provides forces in a forward direction 524 and an aft direction 526.

Figure 5B:
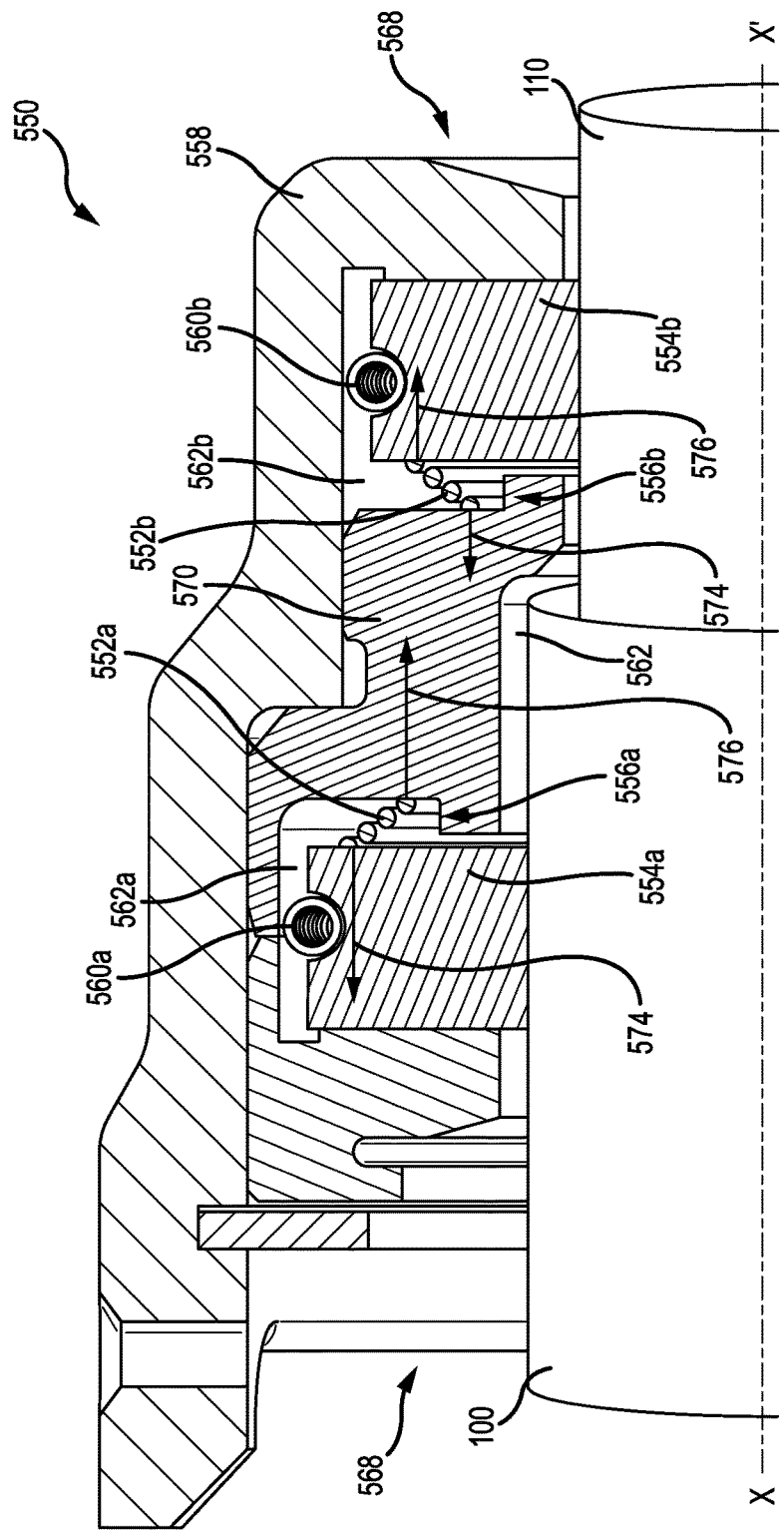

FIG. 5B illustrates a carbon seal assembly 550 similar to carbon seal assemblies 250, 350, and 450, with similar elements which are numbered similarly, such as carbon seals 554, spring retention surfaces 556, carbon seal arrangement 558, garter springs 560, air section 562, oil sections 568, and mating hardware 570. The first carbon seal 554a and the second carbon seal 554b are disposed circumferentially around the shaft 100 and the second shaft 110, respectively. Oil section 568 may include multiple oil sections.

Carbon seal assembly 550 also includes carbon seal springs 552, which are large diameter tapered coil springs similar to carbon seal spring 502, having diameters larger than shaft 100 and second shaft 110. The carbon seal springs 552 provide forces in a forward direction 574 and in an aft direction 576, similar to carbon seals 252, 352, and 452.

Figure 6A:
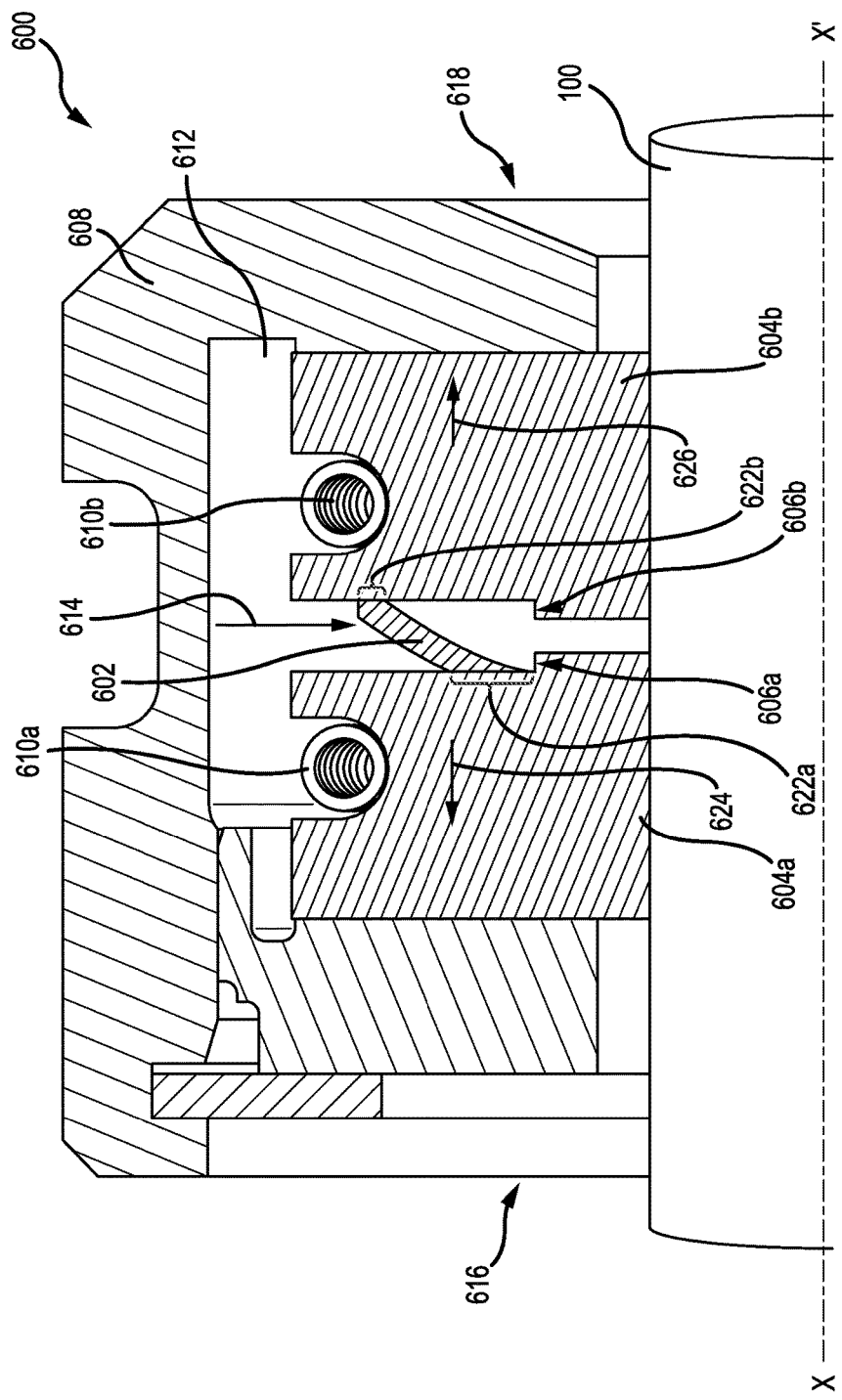
FIGS. 6A and 6B are schematic cross-sections of carbon seal assemblies with diaphragm spring carbon seal springs.

FIG. 6A illustrates a carbon seal assembly 600 similar to carbon seal assemblies 200, 300, 400, and 500, with similar elements which are numbered similarly, such as carbon seals 604, spring retention surfaces 606, carbon seal arrangement 608, garter springs 610, buffer air section 612, buffer air direction 614, air section 616, and oil section 618.

Carbon seal assembly 600 also includes carbon seal spring 602, which comprises a diaphragm spring. Similar to carbon seal springs 302, 402, and 502, carbon seal spring 602 has contact surfaces 622a and 622b between the carbon seal spring 602 and first carbon seal 604a, and between the carbon seal spring 602 and second carbon seal 604b, respectively. Carbon seal spring 602 provides forces in a forward direction 624 and an aft direction 626.

Figure 6B:
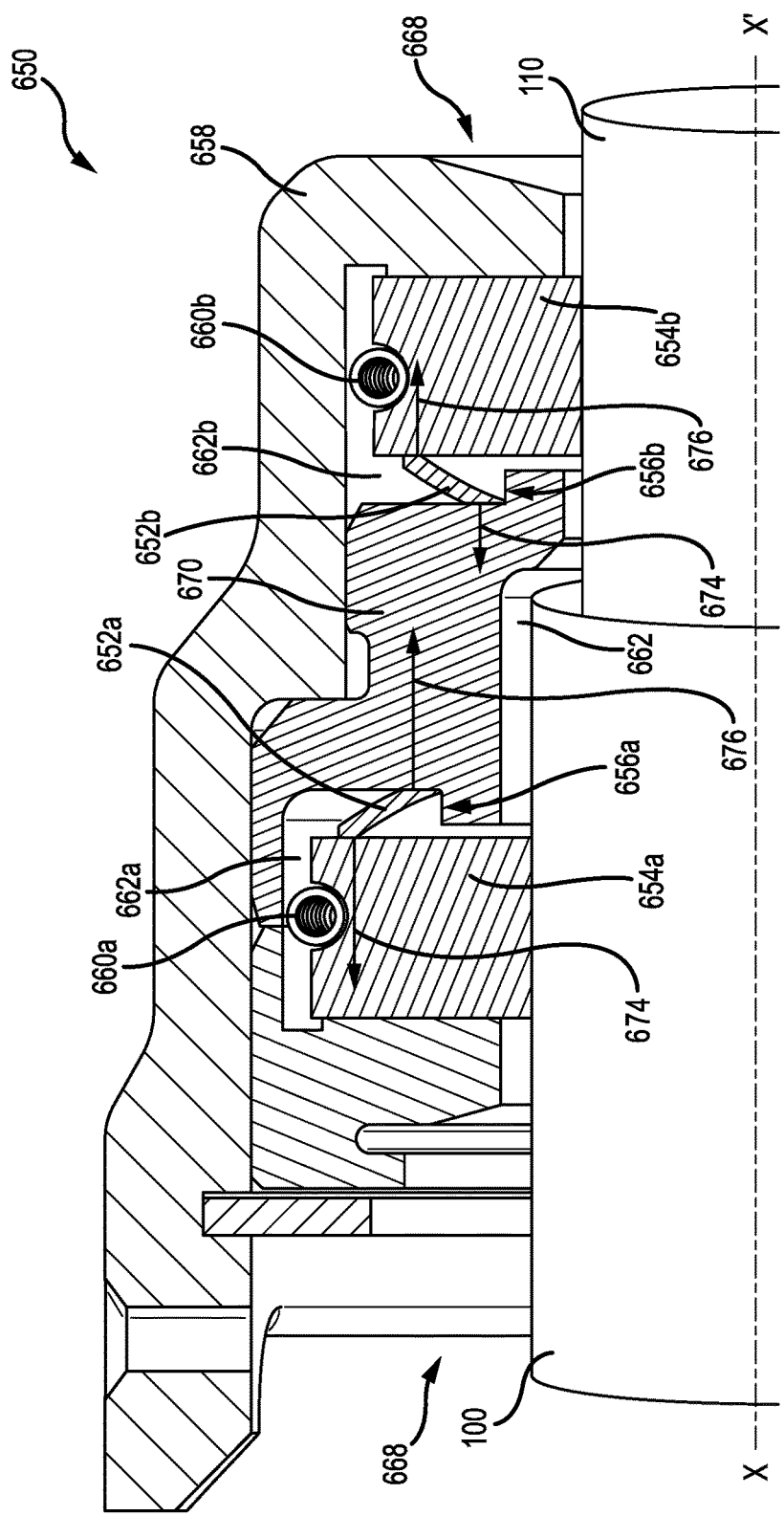

FIG. 6B illustrates a carbon seal assembly 650 similar to carbon seal assemblies 250, 350, 450, and 550, with similar elements which are numbered similarly, such as carbon seals 654, spring retention surfaces 656, carbon seal arrangement 658, garter springs 660, air section 662, oil sections 668, and mating hardware 670. The first carbon seal 654a and the second carbon seal 654b are disposed circumferentially around the shaft 100 and the second shaft 110, respectively. Oil section 668 may include multiple oil sections.

Carbon seal assembly 650 also includes carbon seal springs 652, which are diaphragm springs similar to carbon seal spring 602. The carbon seal springs 652 provide forces in a forward direction 674 and in an aft direction 676, similar to carbon seals 252, 352, 452, and 552.

FIG. 7 illustrates a carbon seal assembly 700 similar to carbon seal assembly 200 and a carbon seal assembly 750 similar to carbon seal assembly 250 with similar elements which are numbered similarly, such as carbon seals 704 and 754, carbon seal arrangements 708 and 758, and mating hardware 770. Carbon seal assemblies 700 and 750 are circumferential around an axis X-X', as shown in FIG. 1.

FIG. 7 also illustrates carbon seal springs 702 and 752, which are wave springs and similar to carbon seal springs 202 and 252. Carbon seal springs 702 and 752 may have broken section 790, which is a non-connected overlapping section of the wave spring. FIG. 7 also illustrates a carbon seal spring 703 which includes one or more wave springs with shim ends providing a uniform surface.

Figure 8:
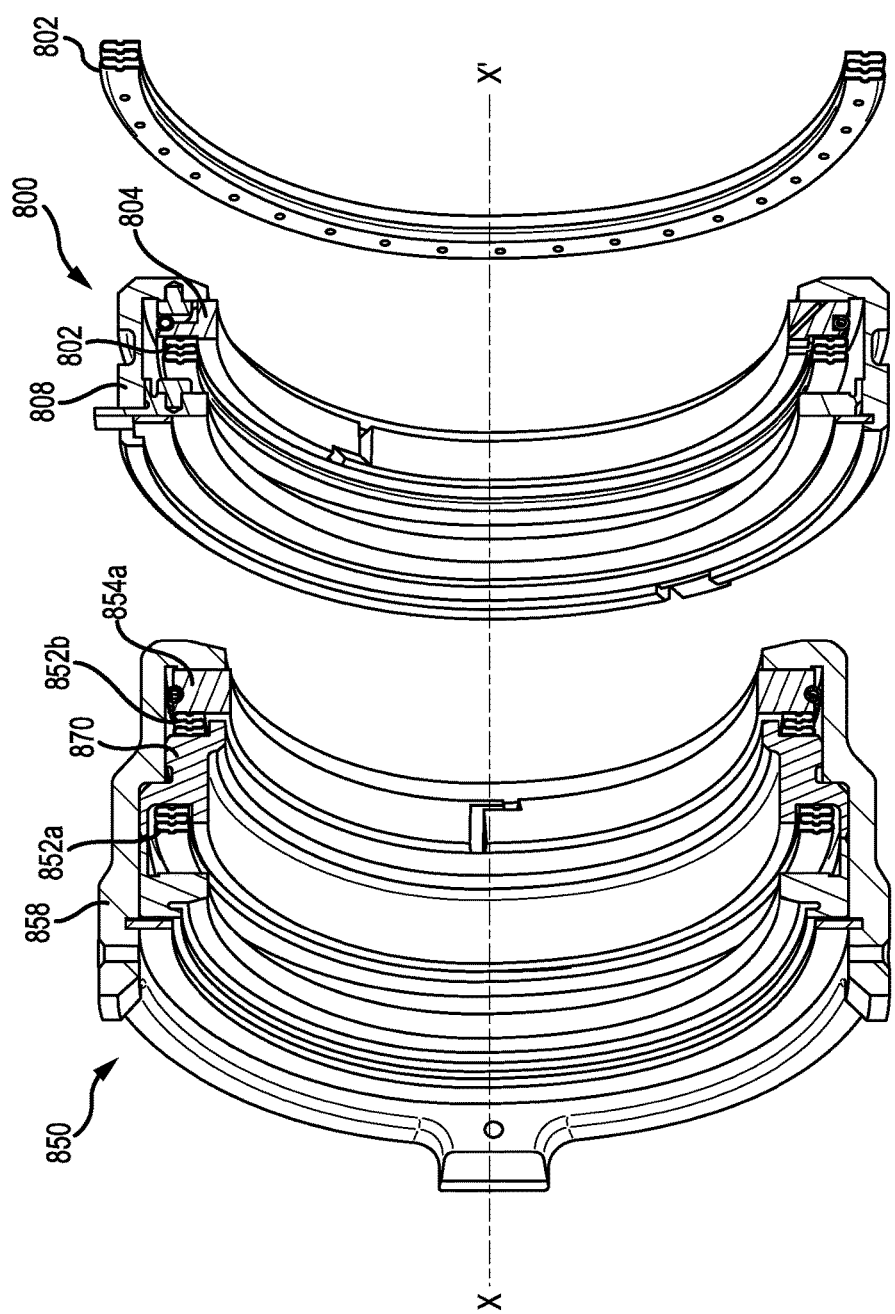
FIG. 8 is a schematic cross-section of carbon seal assemblies with bellows spring carbon seal springs.

FIG. 8 illustrates a carbon seal assembly 800 similar to carbon seal assembly 300 and a carbon seal assembly 850 similar to carbon seal assembly 350 with similar elements which are numbered similarly, such as carbon seals 804 and 854, carbon seal arrangements 808 and 858, and mating hardware 870. Carbon seal assemblies 800 and 850 are circumferential around an axis X-X', as shown in FIG. 1. FIG. 8 also illustrates carbon seal springs 802 and 852, which are bellows springs and similar to bellows spring carbon seal springs 302 and 352. Use of bellows springs increases the contact area between the carbon seal spring and the contacting surface, as compared to using wave springs.

Figure 9:
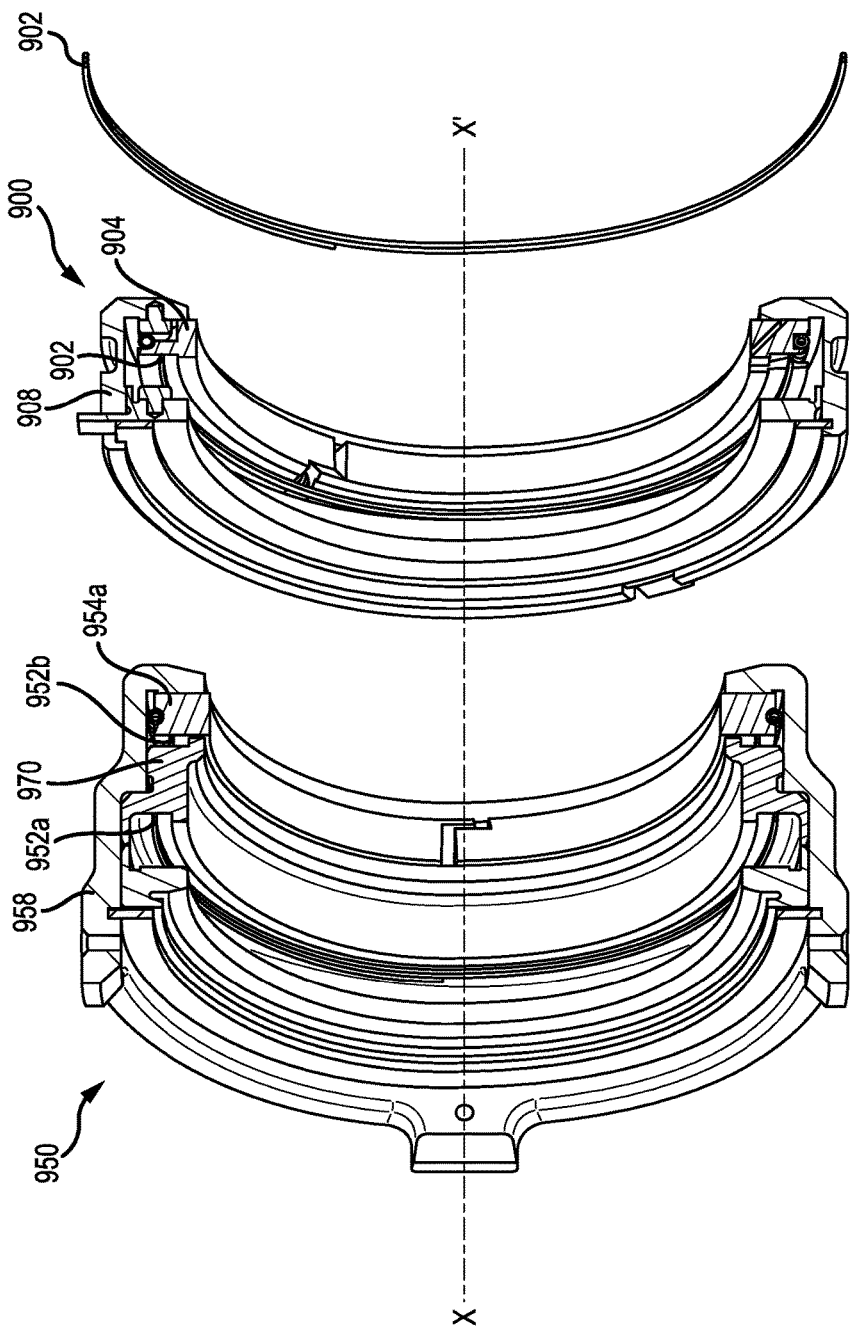
FIG. 9 is a schematic cross-section of carbon seal assemblies with large diameter coil spring carbon seal springs.

FIG. 9 illustrates a carbon seal assembly 900 similar to carbon seal assembly 400 and a carbon seal assembly 950 similar to carbon seal assembly 450 with similar elements which are numbered similarly, such as carbon seals 904 and 954, carbon seal arrangements 908 and 958, and mating hardware 970. Carbon seal assemblies 900 and 950 are circumferential around an axis X-X', as shown in FIG. 1. FIG. 9 also illustrates carbon seal springs 902 and 952, which are large diameter springs and similar to large diameter spring carbon seal springs 402 and 452.

Figure 10:
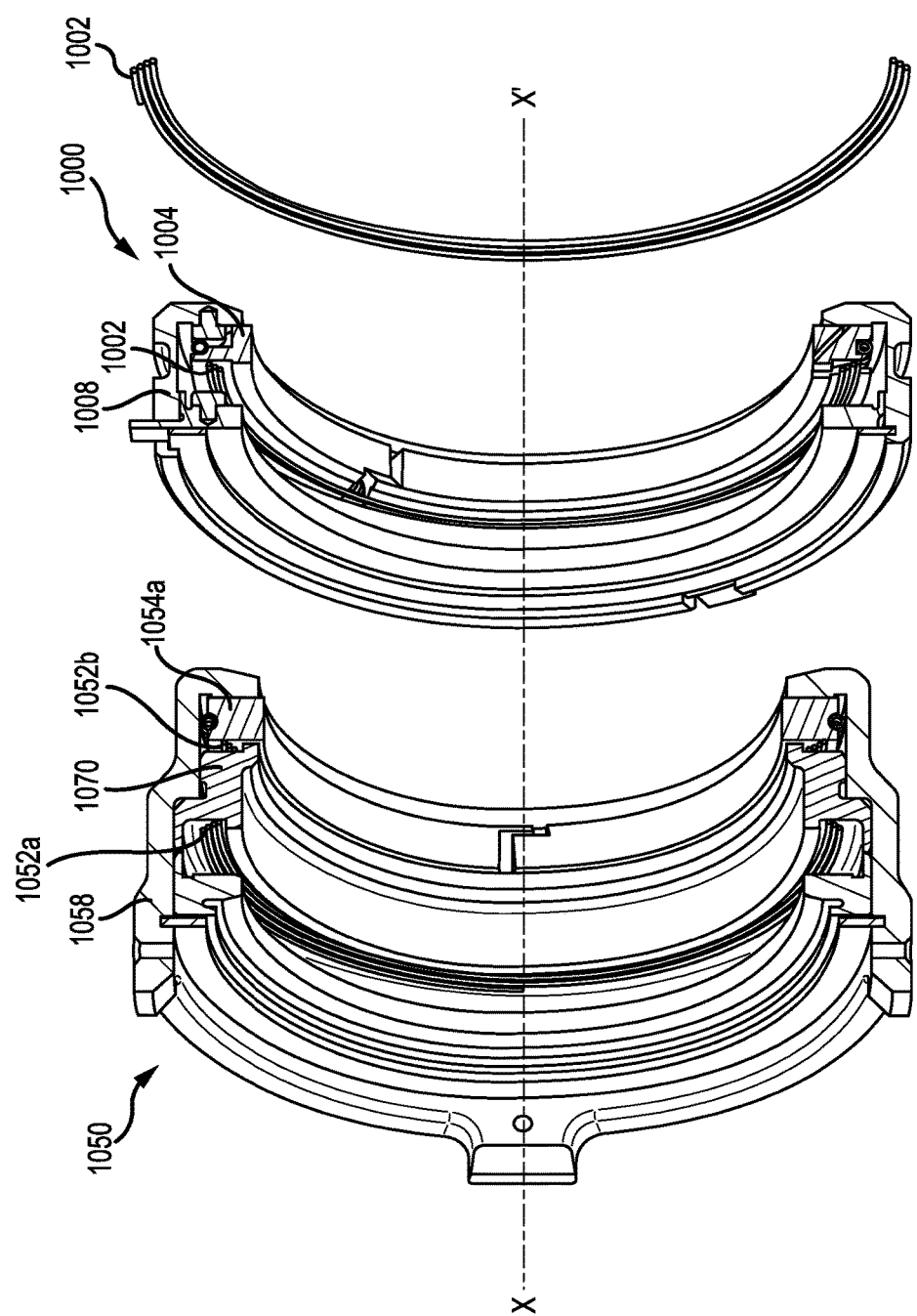
FIG. 10 is a schematic cross-section of carbon seal assemblies with large diameter tapered coil spring carbon seal springs.

FIG. 10 illustrates a carbon seal assembly 1000 similar to carbon seal assembly 500 and a carbon seal assembly 1050 similar to carbon seal assembly 550 with similar elements which are numbered similarly, such as carbon seals 1004 and 1054, carbon seal arrangements 1008 and 1058, and mating hardware 1070. Carbon seal assemblies 1000 and 1050 are circumferential around an axis X-X', as shown in FIG. 1. FIG. 10 also illustrates carbon seal springs 1002 and 1052, which are tapered large diameter springs and similar to tapered large diameter spring carbon seal springs 502 and 552.

Figure 11:
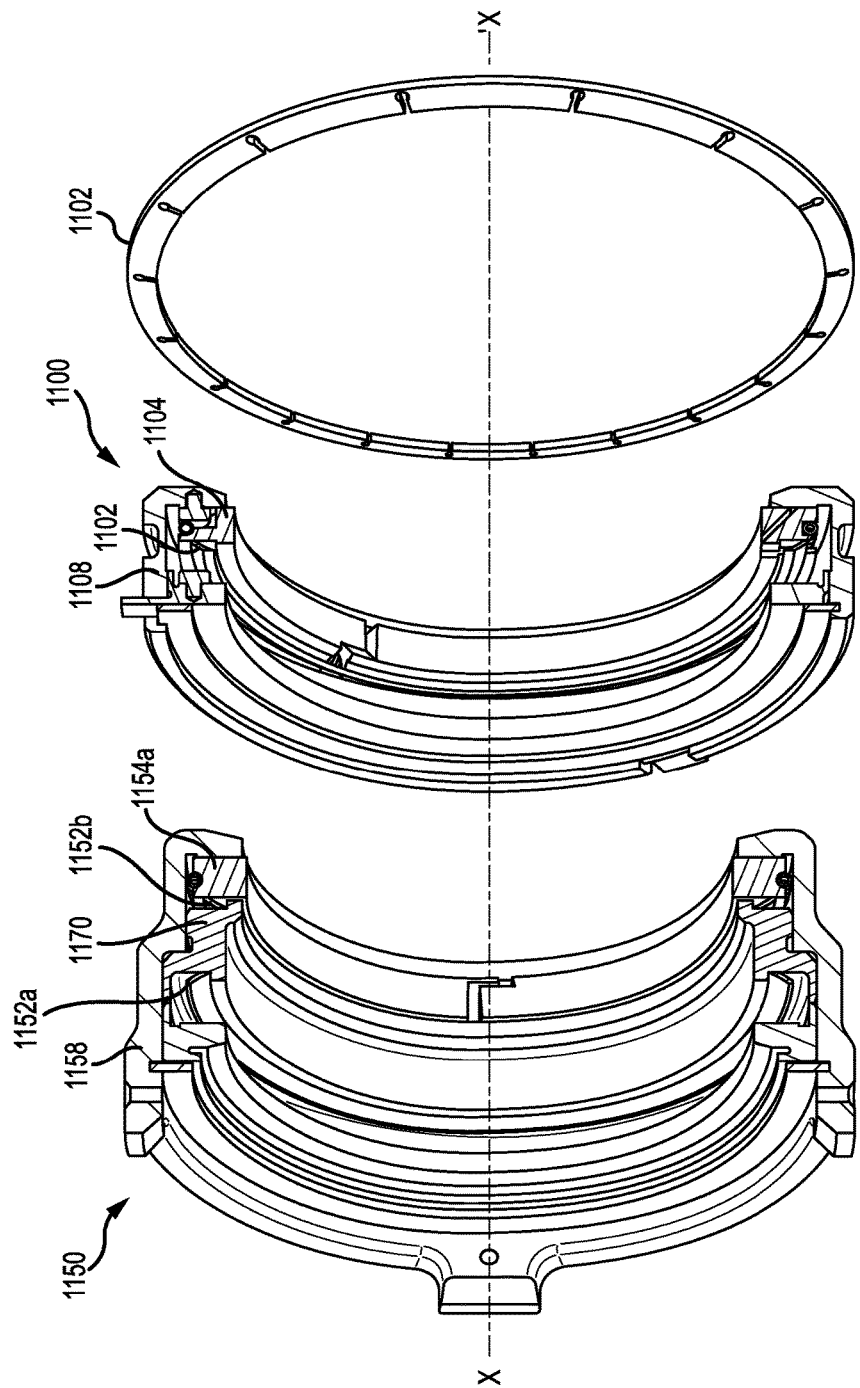
FIG. 11 is a schematic cross-section of carbon seal assemblies with diaphragm spring carbon seal springs.

FIG. 11 illustrates a carbon seal assembly 1100 similar to carbon seal assembly 600 and a carbon seal assembly 1150 similar to carbon seal assembly 650 with similar elements which are numbered similarly, such as carbon seals 1104 and 1154, carbon seal arrangements 1108 and 1158, and mating hardware 1170. Carbon seal assemblies 1100 and 1150 are circumferential around an axis X-X', as shown in FIG. 1. FIG. 11 also illustrates carbon seal springs 1102 and 1152, which are diaphragm springs and similar to diaphragm spring carbon seal springs 602 and 652.

Figure 12:
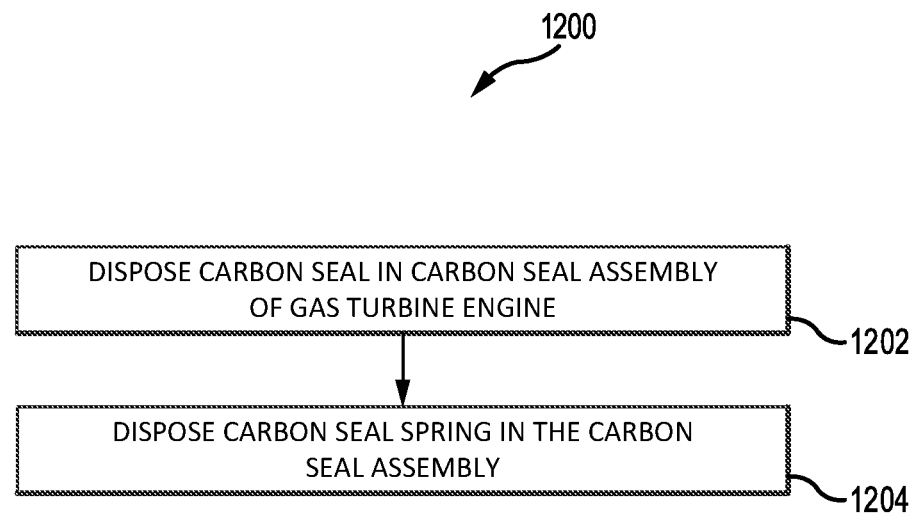
FIG. 12 is a flowchart describing the steps of installing a carbon seal assembly.

FIG. 12 illustrates a method 1200 for installing any of the carbon seal assemblies described herein. Any of the blocks illustrating the method 1200 may be performed in any order.

In block 1202, one or more carbon seals are disposed in a carbon seal assembly of a gas turbine engine. The one or more carbon seals are annular and disposed circumferentially around an axis of the gas turbine engine.

In block 1204, a carbon seal spring is disposed in the carbon seal assembly. The carbon seal spring may be annular and disposed circumferentially around the axis of the gas turbine engine. As described herein, a single carbon seal spring may be disposed in the carbon seal assembly, or multiple carbon seal springs may be disposed on the carbon seal assembly. The carbon seal spring provides force against the carbon seal in an axial direction, and may be a wave spring, a bellows spring, a large diameter coil spring, a large diameter tapered coil spring, or a diaphragm spring.

Any of the carbon seal springs disclosed herein (e.g., 202, 252, 302, 352, 402, 452, 502, 552, 602, 652, 702, 752, 802, 802, 902, 952, 1002, 1052, 1102, or 1152) may be made of a metal material such as steel, stainless steel, carbon steel, high carbon steel, nickel, titanium, or alloys of the same.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine comprising:
   a first carbon seal configured to form a seal against a first rotating shaft of the gas turbine engine, wherein the first rotating shaft has a first diameter;
   a second carbon seal configured to form a seal against a second rotating shaft of the gas turbine engine, wherein the second rotating shaft has a second diameter that is different than the first diameter;
   a mating hardware disposed between the first carbon seal and the second carbon seal;
   a first carbon seal spring configured to provide force against the first carbon seal in a first axial direction and provide force against the mating hardware in a second axial direction opposite the first axial direction, the first carbon seal spring having an annular shape and circumferentially disposed around the first rotating shaft of the gas turbine engine; and
   a second carbon seal spring having the annular shape, circumferentially disposed around the second rotating shaft of the gas turbine engine, and configured to provide force against the second carbon seal in the second axial direction and configured to provide force against the mating hardware in the first axial direction.

2. The gas turbine engine of claim 1, wherein the first carbon seal spring is a wave spring, a bellows spring, a large diameter coil spring, a large diameter tapered coil spring, or a diaphragm spring.

3. The gas turbine engine of claim 1, wherein the second carbon seal spring is a wave spring, a bellows spring, a large diameter coil spring, a large diameter tapered coil spring, or a diaphragm spring.

4. The gas turbine engine of claim 1, wherein the first carbon seal spring and the second carbon seal spring are a same type of spring.

5. The gas turbine engine of claim 1, wherein the first carbon seal spring and the second carbon seal spring are a different type of spring.

6. The gas turbine engine of claim 1, wherein the mating hardware comprises:
   a first retention surface disposed radially between the first carbon seal spring and the first rotating shaft; and
   a second retention surface disposed radially between the second carbon seal spring and the second shaft.

7. The gas turbine engine of claim 6, wherein the first retention surface is disposed radially outward of the second retention surface.

8. The gas turbine engine of claim 1, wherein the mating hardware is disposed radially outward of and extends axially across a transition from the first diameter to the second diameter.

* * * * *